Nov. 17, 1953     L. D. SINGLETON     2,659,593
WEIGHING SCALE
Filed Aug. 23, 1950     2 Sheets-Sheet 1
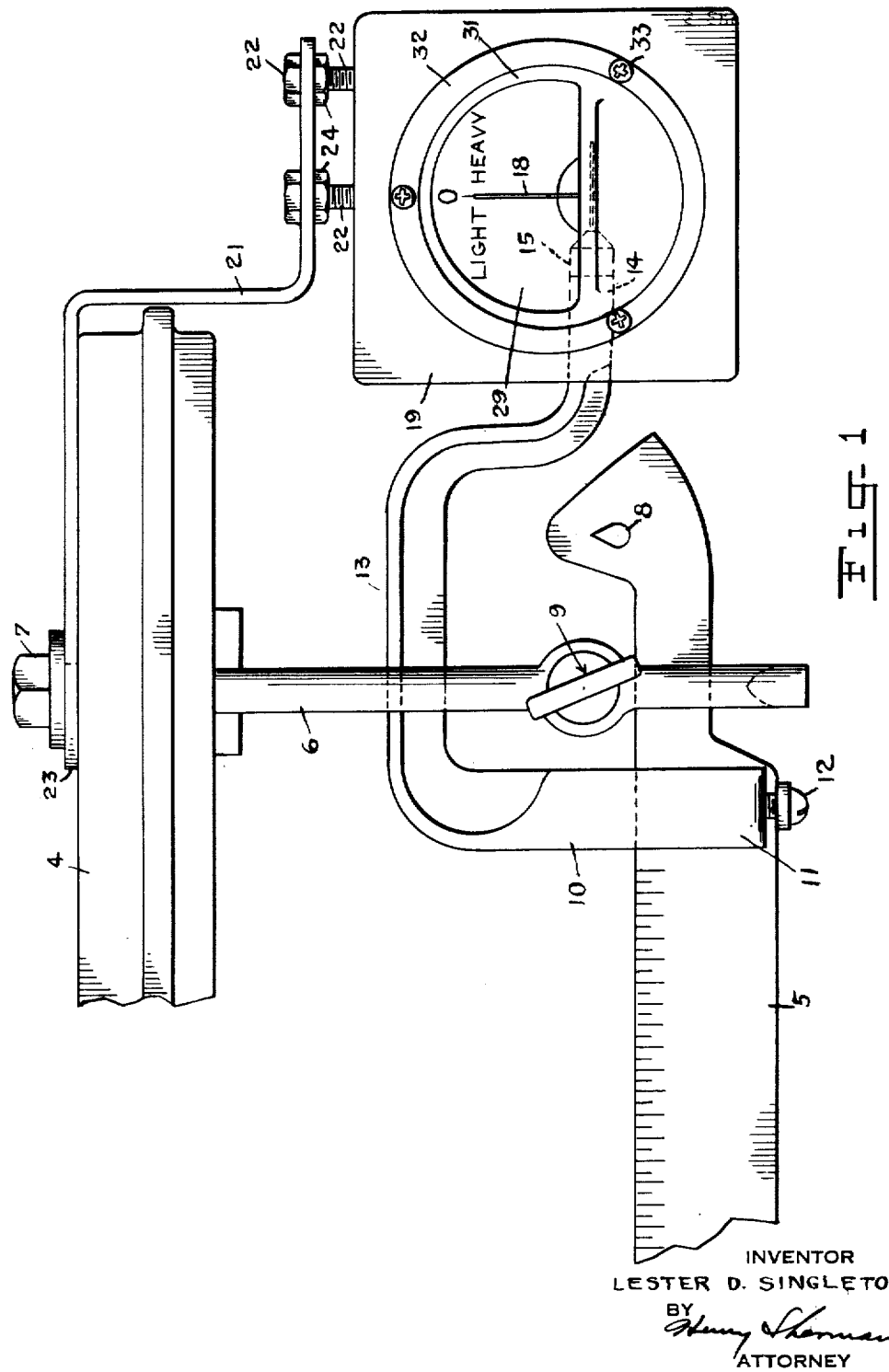
INVENTOR
LESTER D. SINGLETON
BY
ATTORNEY

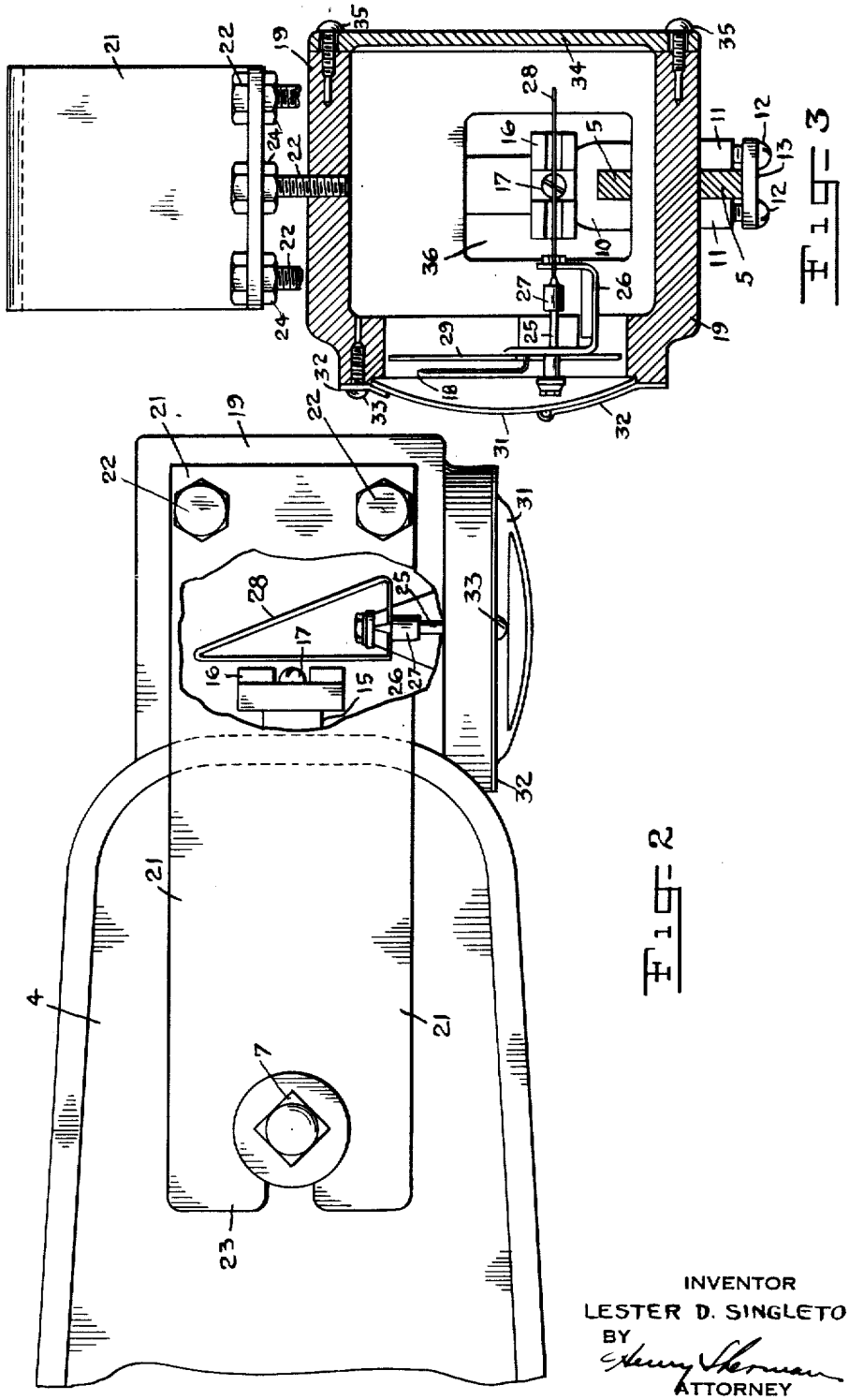

Patented Nov. 17, 1953

2,659,593

UNITED STATES PATENT OFFICE 2,659,593

WEIGHING SCALE

Lester D. Singleton, Burlington, Vt., assignor to H. A. Hadley Associates, Inc., Burlington, Vt., a corporation of Vermont Application August 23, 1950, Serial No. 180,998

5 Claims. (Cl. 265—58)

This invention relates to weighing scales, and relates more particularly to an indicating device for attachment to a beam scale.

In weighing operations employing beam scales, the tendency to oscillation of the beam renders the determination of the approach of the beam to the "even-balance" position relatively difficult and time-consuming. Many devices have heretofore been suggested for attachment to beam scales for the purpose of more quickly and readily indicating the approach of the beam to a balance. However, they have been to say the least bulky in size, intricate in design and expensive in cost.

It is an important object of my invention to provide an improved indicating device attachment for beam scales which will be free from the foregoing and other disadvantages and which will be especially simple in construction, efficient in use and inexpensive in cost.

A more specific object of my invention is the provision of an indicating device attachment for beam scales which may be readily installed on and removed from beam scale without marring the same in any manner.

A further object of my invention is the provision of an indicating device attachment for beam scales wherein a magnet movable by the beam of the scale is adapted to move an indicator relative to a chart.

Other objects of my invention, together with certain details of construction and combinations of parts, will appear from the following description and will be pointed out in the appended claims.

In the drawings wherein a preferred embodiment of my invention is shown,

Fig. 1 is a fragmental elevational view of the indicating device attachment of my invention mounted on a beam scale, Fig. 2 is a top plan view of the indicating device attachment, broken away to show the magnet mounted on the beam and the element movable thereby, and Fig. 3 is a vertical cross section through the housing of the indicating device attachment.

Like reference numerals indicate like parts throughout the several views of the drawings.

Referring now to the drawings for a detailed description of my invention, the reference numeral 4 designates the shelf normally mounted on the standard of a beam scale of the platform type, which standard is provided with means for fulcruming the beam 5. The free end of the beam 5 oscillates within a shackle 6 attached to the shelf 4 by means of a bolt 7, and has in the tip thereof a knife-edge pivot 8 adapted to support a loop on which the counterpoise receiving hook is normally suspended. The shackle 6 is provided with a beam locking arrangement generally indicated by reference numeral 9. The foregoing elements are more-or-less standard on beam scales.

The indicating device attachment of my invention comprises a bracket 10 having a bifurcated end 11 which is fixed to the free end of beam 5 by means of screwbolts 12 and a link 13, the bracket 10 being arched at 14 to clear the beam lock 9 and the tip of the beam. The free end of the bracket 10 has an integral horizontal extension 15 to which is attached a permanent magnet 16 by means of a screw 17. The movement of beam 5 moves bracket 10 causing the magnet 16 fixed to the latter to move the indicator 18 of an indicating pointer mechanism hereinafter described.

The indicating pointer mechanism of my invention is enclosed in a housing 19 which is attached to one end of a bracket 21, by means of a plurality of bolts 22. The other end of bracket 21 is bifurcated as shown at 23 and is readily attached to the shelf 4 of the beam scale by loosening the bolt 7, slipping the bifurcated end 23 of the bracket 22 underneath the bolt 7 and then tightening the same.

Bracket 10 is horizontally adjustable along beam 5 and the housing 19 may be adjusted in a vertical direction by turning bolts 22, lock nuts 24 being provided to maintain the housing in adjusted position, and also in a horizontal direction.

The indicator pointing mechanism in housing 19 comprises a shaft 25 which is journaled in a bracket 26 suitably fixed in the housing 19. To a boss 27 on shaft 25 is soldered or otherwise attached a wire 28 which is preferably in the form of a triangle as shown in the interest of strength and rigidity; however, the wire 28 may also be in the form of a single strand mounted on the shaft 25 and extending in the plane of the magnet 16. The indicator 18 is operatively connected to the shaft 25 for rotation therewith. The indicator is adapted to move over the face of a chart 29, suitably supported in the housing, which is provided with the desired graduation and/or legends. The chart and indicator are preferably covered by a glass cover 31 framed by a bezel or rim 32 which is held on the housing 19 by a screw 33. The rear of the housing may be provided with a cover plate 34 held by screws 35, which may be removed to afford access to the interior of the housing.

In applying the indicating device attachment to a beam scale, the bracket 21 carrying the indicating pointer mechanism is first mounted on the shelf 4. The bracket 10 is there mounted on beam 5 with the extension 14 carrying the permanent magnet 16 passing into the housing 19, in proximity to wire 28, through an opening 36 provided in a side wall of the housing. The two elements of the attachment are then adjusted relative to each other so that the indicator 18 will be at the zero position when the beam 5 is in its evenly balanced condition.

If desired, means may be provided to dampen the oscillations of the beam 5 and indicator 18. Accordingly, the butt end of beam 5 may have operatively connected thereto a dash pot arrangement adapted to bring the beam to rest quickly.

Among the many advantages of the indicating device attachment of my invention is the fact that regardless of the lateral position of the beam the relative position of the magnet 16 and wire 28 will not be altered, i. e. they will always be in the same horizontal plane and in operative position. Moreover, my attachment is so simple and of such rugged construction that an unskilled person can readily attach the same to any beam scale and make the necessary adjustments.

With my attachment on a platform scale, there is obtained the accurate weighing which this type of scale affords, together with means for indicating the condition of approaching balance of the load on the scale. Since my attachment permits of the final balance to be determined by the scale itself, the beam being always free to oscillate, the accuracy of the platform scale is not impaired by my attachment.

The embodiment of my invention above described in connection with the showing in the drawings is to be regarded as illustrative only, since my invention is susceptible of variations, modification and change within the spirit and scope of the appended claims.

I claim:

1. A removable indicating device attachment for a beam scale wherein the beam has a free end oscillatable within a restraining member and a shelf for supporting said beam, said indicating device comprising a bracket adjustably mounted on said beam, a magnet fixed to said bracket, a second bracket adjustably mounted on said shelf, a housing carried by said second bracket, and load indicating means in said housing, said load indicating means being movable by the attraction of said magnet.

2. A removable indicating device attachment for a beam scale wherein the beam has a free end oscillatable within a restraining member and a shelf for supporting said beam, said indicating device comprising a bracket adjustably mounted on said beam, and having a free end extruding net fixed to said free end of said bracket, a longitudinally with respect to said beam, a magsecond bracket adjustably mounted on said shelf, a housing carried by said second bracket, and load indicating means in said housing, said load indicating means being movable by the attraction of said magnet.

3. A removable indicating device attachment for a beam scale wherein the beam has a free end oscillatable within a restraining member and a shelf for supporting said beam, said indicating device comprising a bracket adjustably mounted on said beam and having a free end extending longitudinally with respect to said beam, a magnet fixed to said free end of said bracket, a second bracket adjustably mounted on said shelf, a housing, having an opening therein, carried by said second bracket, and load indicating means in said housing, said load indicating means being movable by the attraction of said magnet extending through said opening in said housing.

4. A removable indicating device attachment for a beam scale wherein the beam has a free end oscillatable within a restraining member and a shelf for supporting said beam, said indicating device comprising a bracket adjustably mounted on said beam, and having a free end extending longitudinally with respect to said beam, a magnet fixed to said free end of said bracket, a second bracket adjustably mounted on said shelf, a housing, having an opening therein, adjustably carried by said second bracket, and load indicating means in said housing, said load indicating means being movable by the attraction of said magnet extending through said opening in said housing.

5. A removable indicating device attachment for a beam scale wherein the beam has a free end oscillatable within a restraining member and a shelf for supporting said beam, said indicating device comprising a bracket adjustably mounted on said beam and having a free end extending longitudinally with respect to said beam, a magnet fixed to said free end of said bracket, a second bracket adjustably mounted on said shelf, a housing, having an opening therein, adjustably carried by said second bracket, and load indicating means in said housing, said load indicating means, a shaft pivotally mounted in said housing, an indicator operatively connected to said shaft and a wire fixed to said shaft and movable by the attraction of said magnet operable within said opening in said housing to rotate said shaft and said indicator.

LESTER D. SINGLETON.

References Cited in the file of this patent

UNITED STATES PATENTS

| Number | Name | Date |
| --- | --- | --- |
| 1,707,148 | Snyder | Mar. 26, 1929 |
| 1,974,940 | Wood | Sept. 25, 1934 |
| 2,475,684 | Weckerly | July 12, 1949 |
| 2,552,319 | Hess | May 8, 1951 |

FOREIGN PATENTS

| Number | Country | Date |
| --- | --- | --- |
| 450,660 | Great Britain | July 22, 1936 |

Disclaimer and Dedication 2,659,593.—*Lester D. Singleton*, Burlington, Vt. WEIGHING SCALE. Patent dated Nov. 17, 1953. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]